(12) United States Patent
Pasanen

(10) Patent No.: US 6,587,450 B1
(45) Date of Patent: Jul. 1, 2003

(54) LOCAL AREA NETWORK

(75) Inventor: Jari Pasanen, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/179,604

(22) Filed: Oct. 27, 1998

(30) Foreign Application Priority Data

Oct. 29, 1997 (FI) .................................................. 974092

(51) Int. Cl.⁷ ................................................ H04Q 7/24
(52) U.S. Cl. ...................... 370/338; 455/556; 455/557
(58) Field of Search ................................ 370/328, 338, 370/345, 349, 389, 392, 432; 709/223, 238; 455/550, 556, 557

(56) References Cited

U.S. PATENT DOCUMENTS

| | | | |
|---|---|---|---|
| 5,465,392 A | * 11/1995 | Baptist et al. | 340/7.32 |
| 5,467,341 A | * 11/1995 | Matsukane et al. | 370/253 |
| 5,623,495 A | * 4/1997 | Eng et al. | 370/338 |
| 5,657,317 A | 8/1997 | Mahany et al. | 370/338 |
| 5,696,903 A | * 12/1997 | Mahany | 709/228 |
| 5,787,341 A | 7/1998 | Parkas et al. | 455/90 |
| 5,797,102 A | 8/1998 | Hallikainen et al. | 455/557 |
| 5,799,255 A | 8/1998 | Berg et al. | 455/551 |
| 6,122,759 A | * 9/2000 | Ayanoglu et al. | 714/4 |

FOREIGN PATENT DOCUMENTS

| | | |
|---|---|---|
| EP | 0749261 A2 | 12/1996 |
| WO | WO 93/12595 | 6/1993 |
| WO | WO 96/21978 | 7/1996 |
| WO | WO 97/04611 | 2/1997 |
| WO | WO 97/08906 | 3/1997 |

OTHER PUBLICATIONS

Finnish Office Action and English translation thereof.

* cited by examiner

Primary Examiner—Dang Ton
Assistant Examiner—Bob A. Phunkulh
(74) Attorney, Agent, or Firm—Perman & Green, LLP

(57) ABSTRACT

A wireless local area network (5) comprises at least one server device (1), one or several peripheral devices (6–15), and circuit (4, 16) for transferring information between the server device (1) and the peripheral devices (6–15). Transmission of information in the wireless local area network (5) is at least partly arranged to be conducted by a plurality of predetermined link agents, wherein the circuit for transferring information comprise circuit (4d, 16d) for generating a predetermined link agent circuit (4a, 16a) for transmitting the generated link agent, circuit (4b, 16b) for receiving the link agent, circuit (4d, 16d) for processing the received link agent, and circuit (4d, 16d) for carrying out one or several operations defined for the predetermined link agent generated.

66 Claims, 6 Drawing Sheets

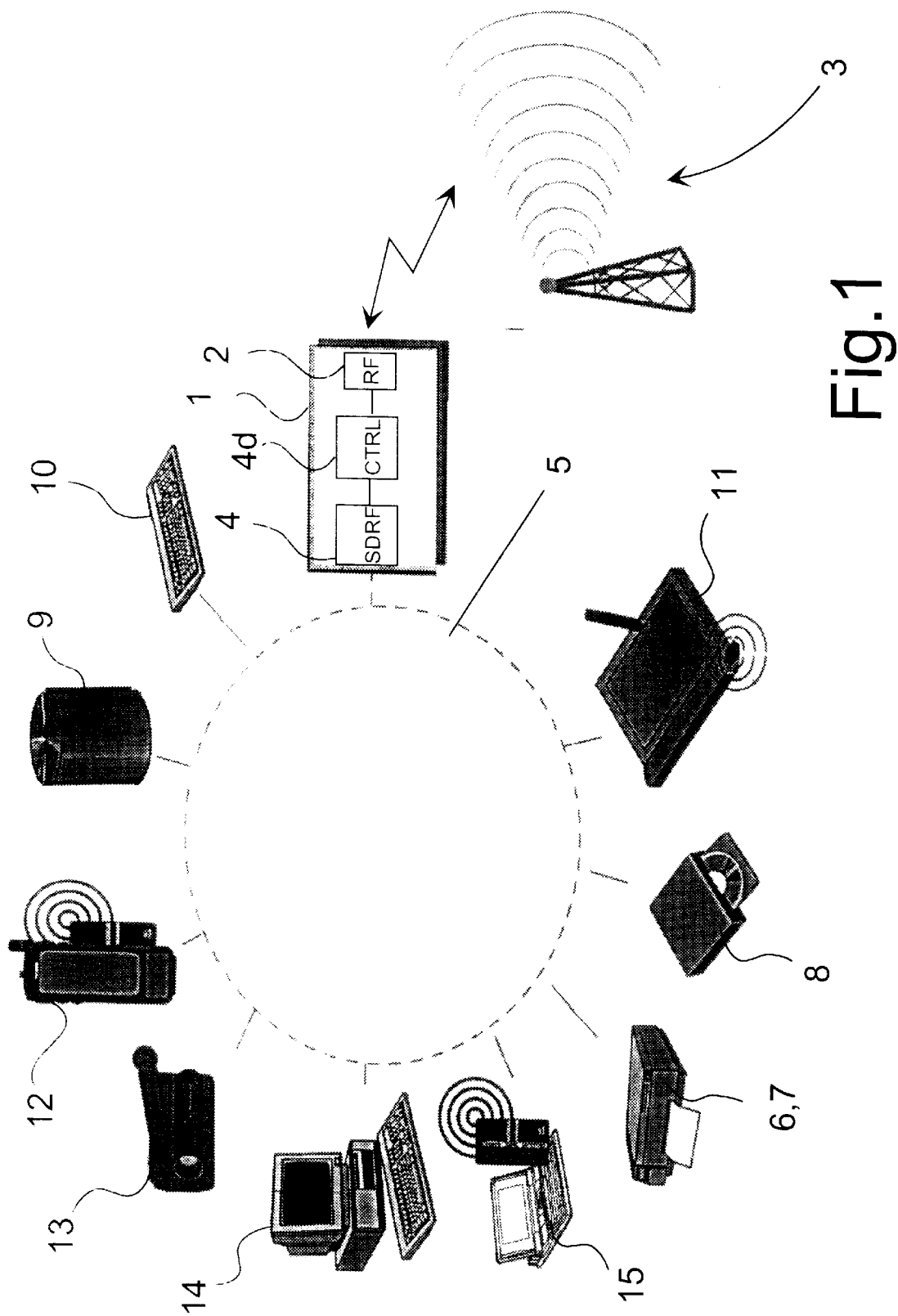

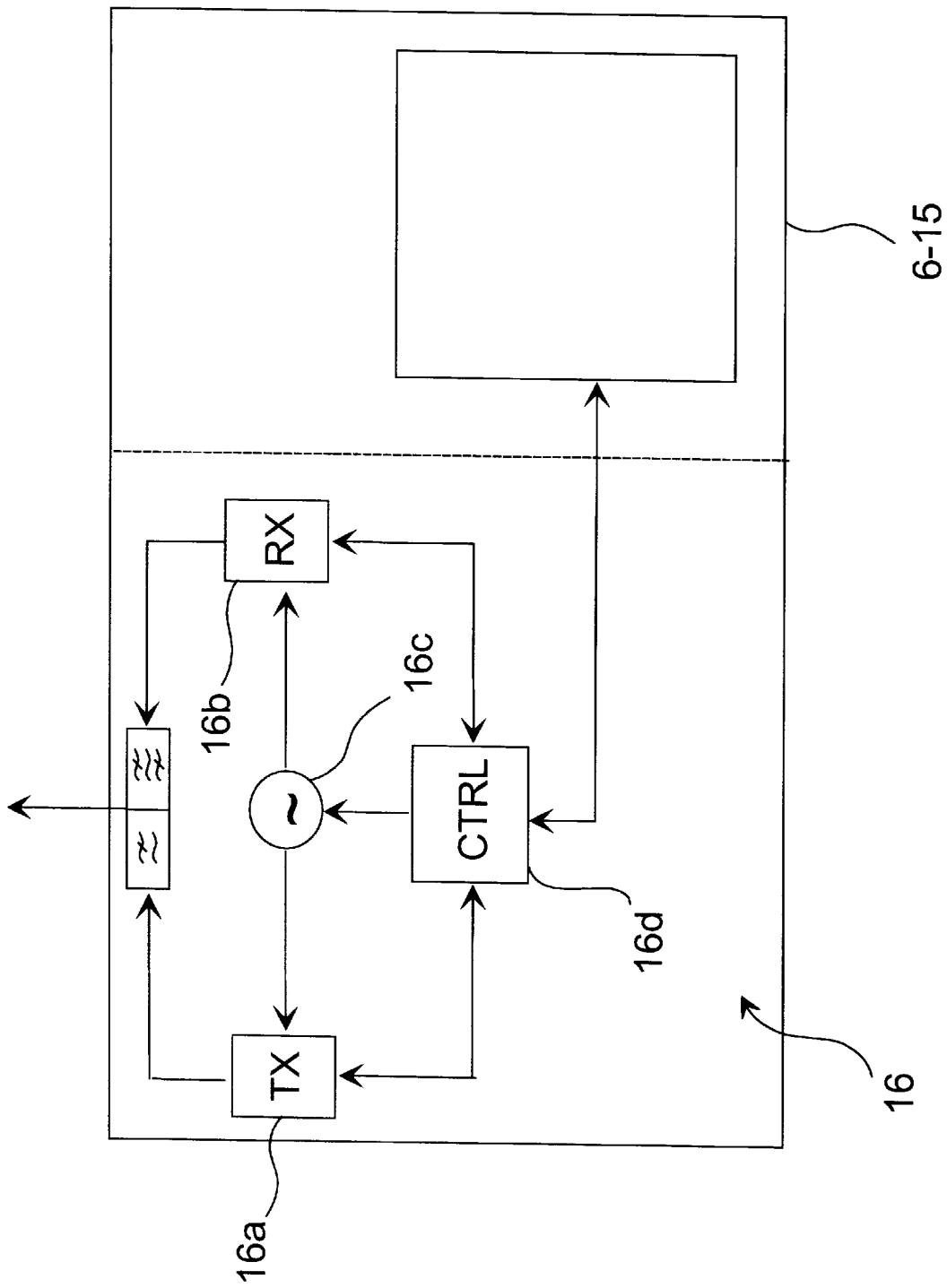

LOCAL AREA NETWORK

Figure 2A:
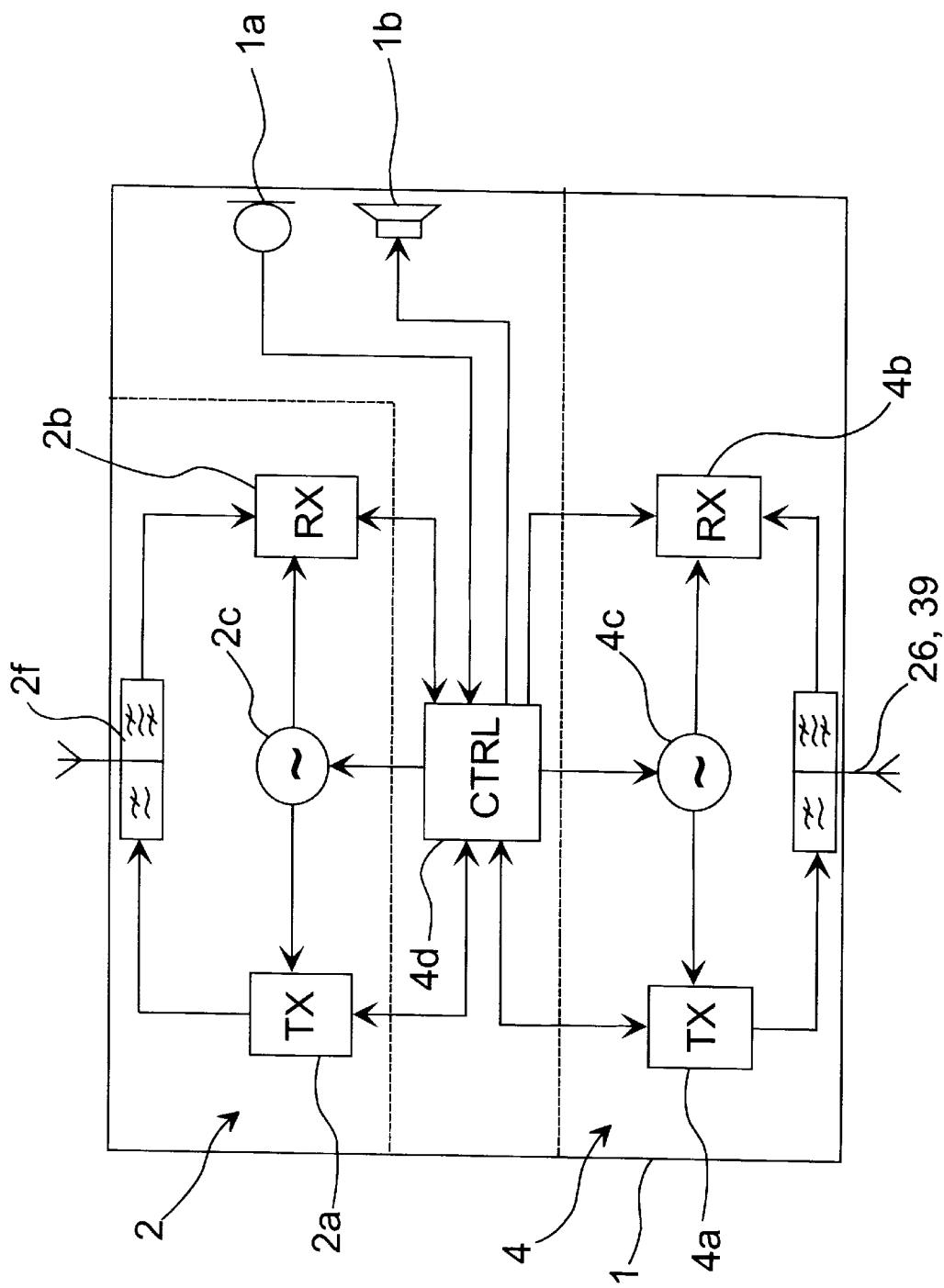

The present invention relates to a wireless local area network comprising at least one server device, one or several peripheral devices, and means for transferring information between the server device and the peripheral devices. The invention relates also to a method for implementing a wireless local area network with at least one server device and one or several peripheral devices, in which local area network information is transferred between the server device and the peripheral devices. The invention relates further to a mobile station comprising means for setting up a connection to a wireless local area network, for transferring information between the mobile station and a device connected to the local area network.

Local area networks usually consist of one or several server computers as well as work stations and other peripheral devices communicating with the same, such as printers and telecopier devices. Data transmission in the local area network is usually implemented by using wires, such as Ethernet cabling. Also wireless local area networks are known, in which data transmission is implemented by means of radio modems. According to their structures, local area networks can be e.g. star networks, ring networks, segmented networks, or combinations of these. In a star network, the server is typically placed in the centre, and a data transmission connection is set up from the server to each peripheral device separately. Thus, communication takes place along cabling between the server and the peripheral device. In a ring network, the server and the peripheral devices are placed in succession to form a ring, wherein data is carried usually in one direction along this network. In this case, information sent by the server is transmitted to the next peripheral device in the ring which transmits it further, until the receiver of the information receives the information. In a segmented network, the server and the peripheral devices are also placed in succession, but there is a so-called terminal adapter after the last peripheral device in a segment. Data transmission is thus bidirectional. Also at the other end of the segment, there is a corresponding terminal adapter. In a ring network and in a segmented network, the respective order of the peripheral devices and the server device is usually not significant.

In local area networks, each peripheral device coupled to the local area network is provided with its own address which identifies the peripheral device and by means of which information is directed to this peripheral device. On the other hand, information coming from the peripheral device is identified in the server on the basis of the address of the peripheral device. In the peripheral device and the server, there is a network adapter determined according to the physical structure of the local area network used in the case, provided with means for receiving messages coming from the local area network and for transmitting messages to the local area network.

Data transmission in local area networks takes place typically as data transmission based on messages. A message consists of address data and the actual information to be transmitted. The message may also contain initial and terminal data on the message, for separating different messages from each other. The address data is used for directing messages to the correct device and, on the other hand, for identifying the device which sent the message.

Wireless local area networks differ from wired ones primarily in that data transmission is conducted by using a wireless data transmission method, such as radio waves or infrared light. In their principle of operation, wireless local area networks are typically star networks, i.e. data is transmitted between the server device and a peripheral device. Thus, information to be transmitted between peripheral devices is conducted from the sending peripheral device to the server which transmits the information further to the receiving peripheral device.

For operation of the local area network, the server must know which peripheral devices are coupled to the local area network at each time and what is the operating state of these peripheral devices. This can be implemented by using for example the above-mentioned, message-based data transmission, wherein the peripheral device sends a message to the server device when turned on and up on a possible change of state. The server device receives the message and examines the information content of the message.

The use of a local area wired network is limited e.g. by the location of cabling, and the number and location of connection points placed in the cabling. Expanding such a local area network will require cabling which in many cases is difficult and expensive, particularly afterwards. Some of these limitations of a local area wired network can be eliminated or their effect can be reduced by setting up the local area network by wireless techniques. However, presently known wireless local area networks are relatively expensive, which limits their use particularly in smaller local area networks.

The use of a local area network is usually limited to the premises of an office. A recent trend is, however, that part of the work that was previously done in the office is now done as remote work at home. In such cases, the transmission of data etc. between the home and the office can be facilitated if there is a compact data processor available with a sufficient storage capacity. An example of such a portable device is Nokia 9000 Communicator which can be used both as a mobile station and a data processor. The small size of the device, however, will usually to some extent limit e.g. the size of the user interface, such as the keypad and the display. Moreover, the storage capacity of the data processor does not necessarily provide the same data processing properties as larger data processors.

Also a portable data processor can be linked to a local area network by means of a network connection card provided with means for setting up a data transmission connection between the local area network and the portable device. The network connection card is coupled to the wired local area network by means of a cable suitable for this. The linkage to and the use of the local area network requires that the server device is in operation so that it is possible to use the other peripheral devices functionally coupled to the local area network, such as printers and a mass storage, from the portable peripheral device. The mass memory comprises for example one or several hard disk drives, on which it is possible to store e.g. application software, text files, image files, and other data files.

Different peripheral devices can be linked to portable data processors directly, without using a local area network. The linkage can also be based on wireless techniques, usually infrared (IR) techniques. When such a peripheral device is connected to a portable data processor or the like, the data on the peripheral device in question must be configured by the data processor before the peripheral device can be used. Furthermore, the number of peripheral devices that can be connected to the portable data processor is usually limited to one peripheral device at the time, which will reduce the usability of such a system. However, for usability, it is often better that several different types of peripheral devices are functionally connected to the data processor at the same time, for example a mass memory, a printer, and a modem.

One purpose of the present invention is to provide a local area network comprising one or several servers and one or several peripheral devices. It is possible to connect several peripheral devices to the local area network, and the detection of their connection can be made automatic, wherein the configuration is carried out by a data processor controlling the local area network. The local area network according to the present invention is primarily characterized in what is presented in the characterizing part of the appended claim 1. The method of the present invention is primarily characterized in what is presented in the characterizing part of the appended claim 5. Further, the mobile station of the present invention is primarily characterized in what is presented in the characterizing part of the appended claim 9. The invention is based on the idea that the local area network is formed by means of predetermined link agents. These link agents take care of not only configuration of the network but also routing of messages to the correct devices; for example, incoming telecopy messages are sent directly to the telecopier device, if necessary.

The invention gives significant advantages to local area networks, methods and mobile stations of prior art. Configuration of the local area network can be arranged to be conducted automatically for example in a situation in which a user enters the office carrying along a portable data processor or the like, which can be used as a server or a peripheral device. Thus, in accordance with an advantageous embodiment of the invention, the peripheral devices in the office and advantageously the server device carried by the user communicate with each other for setting up the configuration data of the local area network. In accordance with a second advantageous embodiment of the invention, the server device is arranged to be stationary, wherein the user carries along a peripheral device by means of which the user can control the server device to set up a personal local area network for the user.

By means of the arrangement of the invention, the user can set up a local area network for his/her use when he/she is in the office, at home or in another location where there are peripheral devices of the invention available. Thus, the user can make use of devices in said location without a need to connect his/her own data processor e.g. in a cable connection with these peripheral devices. On the other hand, setting up a personal local area network for the user will not essentially disturb other users, each of which being able to have a personal local area network set up.

The local area network of the invention can be easily implemented without wiring, wherein also the positioning of peripheral devices is more flexible. A peripheral device belonging to one local area network can simultaneously also belong to several local area networks, wherein the usability of each peripheral device is better than by using presently known local area network solutions. If necessary, the local area network of the invention can be linked also as a part of the local area network in the office, wherein there is no need to add communication devices to the peripheral devices existing in the office for communicating with the personal local area network of the invention, but in this case it will be sufficient that one transmitting device comprising these communicating means is arranged in the local area network of the office. This transmitting device can also be the same device as the user's portable data processor.

Figure 3:
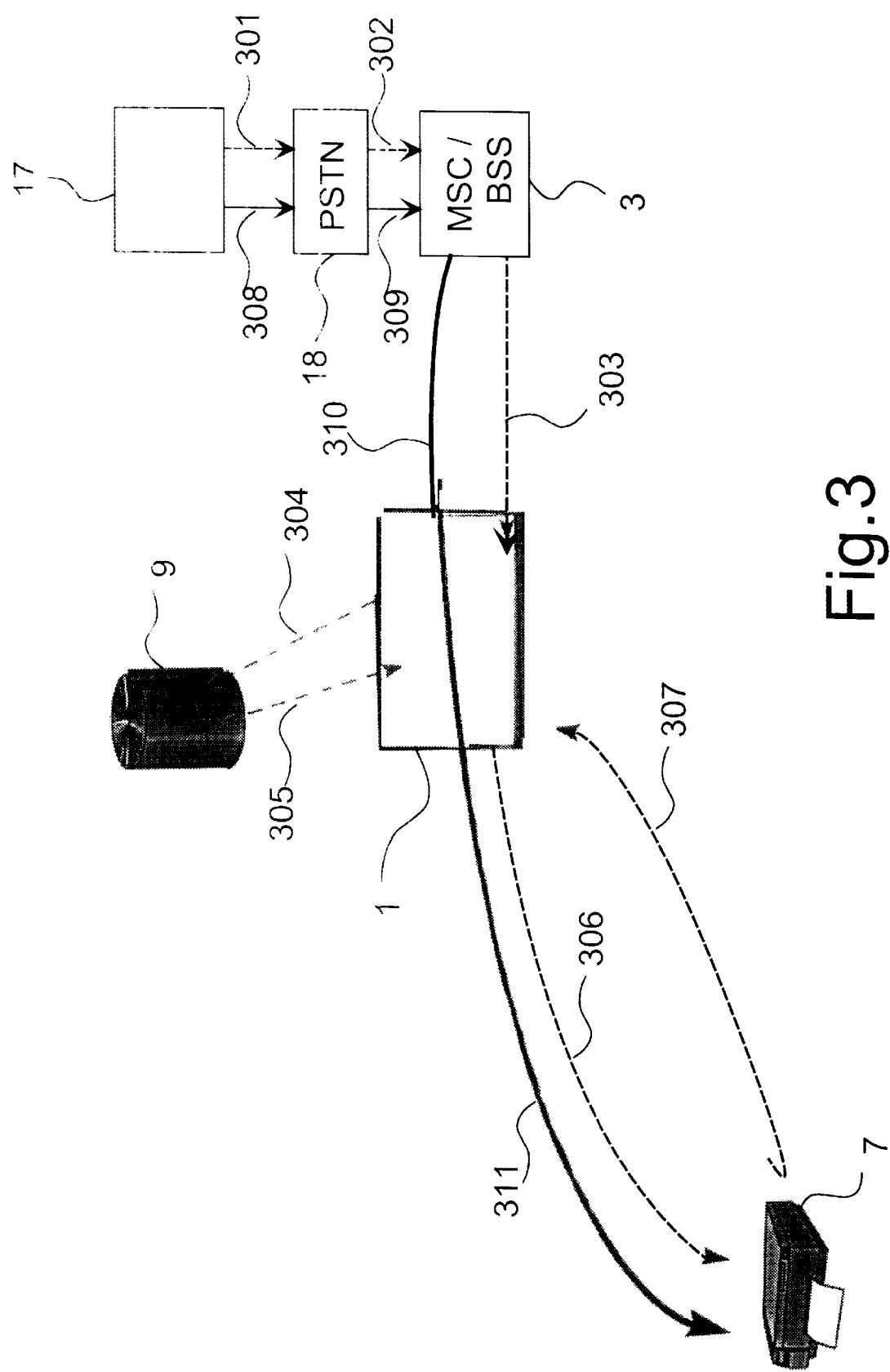
Figure 4A:
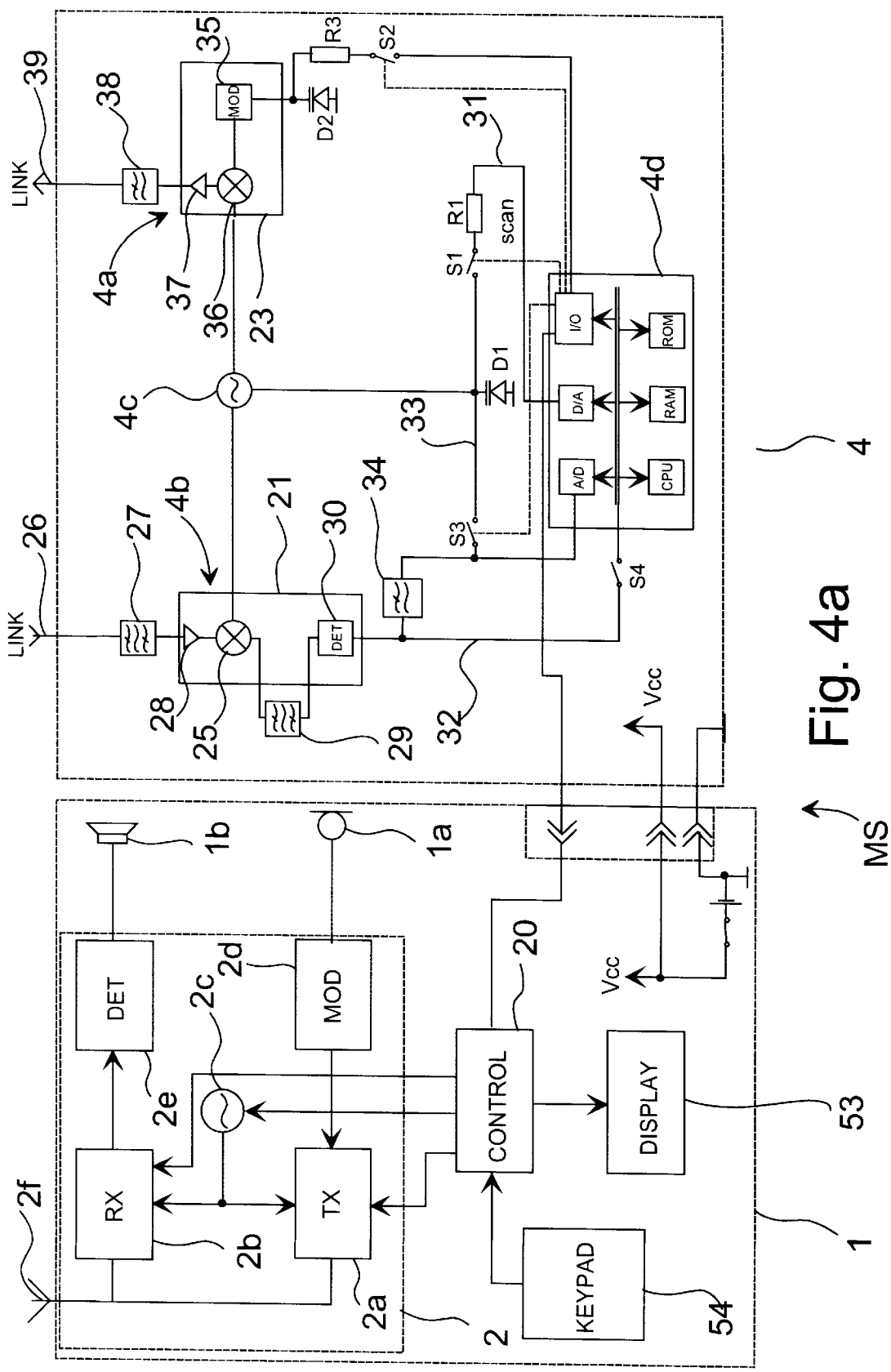
Figure 4B:
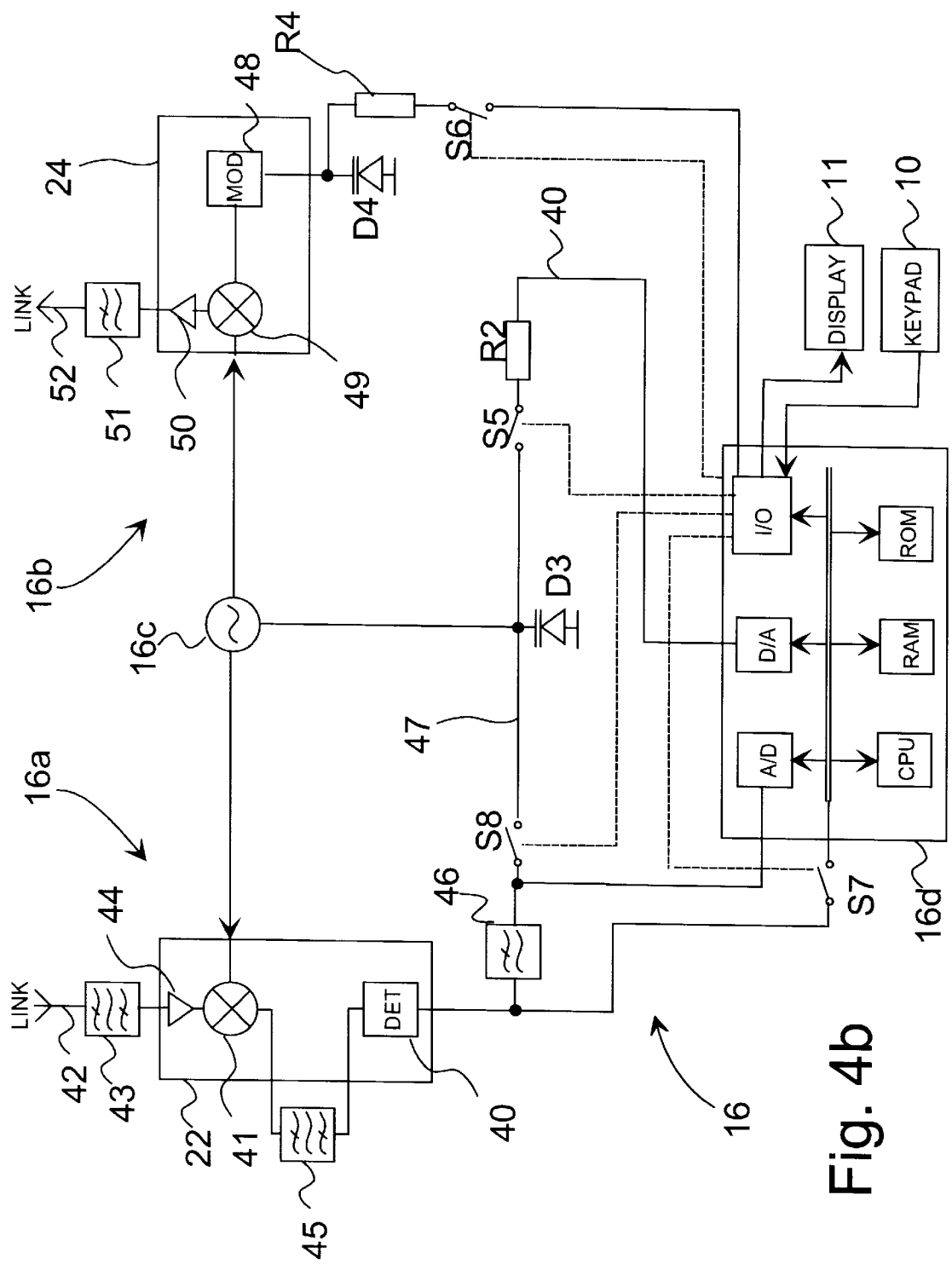

In the following, the present invention will be described in more detail with reference to the appended drawings, in which FIG. 1 shows a local area network according to an advantageous embodiment of the invention in a reduced chart, FIG. 2a shows a server device according to an advantageous embodiment of the invention in a reduced schematic diagram, FIG. 2b shows a peripheral device according to an advantageous embodiment of the invention in a reduced schematic diagram, FIG. 3 shows an example of transmitting a message in a local area network according to the invention, FIG. 4a shows the short-distance link module of a server device according to an advantageous embodiment of the invention in a reduced schematic diagram, and FIG. 4b shows a short-distance link module of a peripheral device according to an advantageous embodiment of the invention in a reduced schematic diagram.

EXAMPLE 1

FIG. 1 is a reduced schematic view on the system according to an advantageous embodiment of the invention. The system comprises a server device 1, such as a mobile station MS, comprising e.g. means 2 for setting up a data transmission connection with a mobile communication network 3, and means 4 for setting up a local area network 5 between the server device 1 and the peripheral devices. Further, the mobile station comprises advantageously a display 53 and a key-pad 54. The peripheral devices in the system of FIG. 1 include a printer 6, a telecopier device 7, a CD-ROM reading device 8, a mass storage 9, an auxiliary keyboard 10, an auxiliary display device 11, and a wireless audio interface 12 equipped with e.g. a microphone and an earpiece to be used instead of the microphone 1a and earpiece 1b of the mobile station 1 for example during a call. FIG. 1 shows also examples of some other peripheral devices: a video camera 13, a personal computer 14 (Desktop PC), and a portable computer 15 (Laptop PC). In the appended FIG. 1, the printer 6 and the telecopier device 7 are shown as one device, but they can also be separate devices. It is obvious that the invention is not limited merely to these peripheral devices 6–15, and that, on the other hand, the invention can also be used in smaller systems not applying all the peripheral devices 6–15 shown in the system of FIG. 1.

The means 2 of the server device 1 for setting up a data transmission connection to the mobile communication network 3, i.e. a long-distance link module (FIG. 2a), comprises for example a radio transmitter 2a, a radio receiver 2b, a local oscillator 2c, a modulator 2d, a demodulator 2e, and an antenna circuit 2f according to the GSM mobile communication system, known as such. However, the invention is not limited solely to the GSM mobile communication system, but the invention can be applied also in other mobile communication systems. The means 4 of the server device 1 for setting up a local area network 5, i.e. a short-distance link module, comprises inter alia a transmitter 4a and a receiver 4b, such as a radio transceiver. In the server device of FIG. 2a, the controller 4d of the short-distance link module of the server device and the controller 20 of the server device are shown in one block (indicated with the reference numeral 4d), but in practical applications they can be also separate, as shown in the schematic diagram of the server device 1 of FIG. 4a.

The peripheral devices 6–15 that can be connected to the local area network are provided with a corresponding short-distance link module 16 of the peripheral device (FIG. 2b), by means of which the peripheral device 6–15 can communicate with the local area network 5, advantageously with the server device 1. The short-distance module 16 of the peripheral device comprises at least a transmitter 16*a* and a receiver 16*b*. An advantageous alternative for implementing the local area network 5 is a short-range radio network (SDRF, short distance radio frequency), wherein no visual or optically reflective connection is needed between the server device 1 and the peripheral devices 6–15. Thus, the different peripheral devices 6–15 and the server device 1 can be even in different rooms, provided that the distance between the server device 1 and the peripheral devices 6–15 is within the operating span of the local area network. The local area network 5 can also be implemented using infrared data transmission, but in this case there must be a visual connection between the server device 1 and the peripheral devices 6–15 either directly or indirectly via reflective surfaces.

In the implementation of a short-range radio network, the local area network 5 is advantageously full duplex, preferably so that it offers the possibility to transmit in both directions simultaneously: from the server device 1 to the peripheral device 6–15 and from the peripheral device 6–15 to the server device 1. Thus, using radio communication, the transmitter 4*a* of the short-distance link module of the server device transmits at the channel frequency of the transmission band (uplink band) of the local area network, and the transmitter 16*a* of the short-distance link module of the peripheral device transmits at the channel frequency of the receiving band (downlink band) of the local area network. In practical applications, the difference between the transmission and receiving channel frequencies is set constant (duplex separation). Thus, the short-distance link module 4, 16 can be advantageously implemented so that the transmitter 4*a*, 16*a* and the receiver 4*b*, 16*b* have a common local oscillator 4*c*, 16*c*, wherein e.g. when the receiver 4*b*, 16*b* is tuned to the desired channel frequency, the transmitter 4*a*, 16*a* is tuned to the duplex separation.

In communication between different devices in a local area network according to the invention, it is advantageous to use so-called predetermined link agents. These link agents are certain kind of independently operating adaptive processes with a certain task that they pursue to perform. Adaptivity refers in this context to the fact that different parameters and changes in the operational environment, such as connecting peripheral devices to and from the network, can be considered when performing a task related to a link agent. Independency of the link agent refers primarily to the fact that performing the link agent is not necessary bound to the device 1, 6–15 in which the link agent is generated but that link agents can be transferred from one device to another. Thus, also processing the link agent is transferred to the device receiving the link agent. The devices processing link agents are provided with means for processing link agents. Such means comprise e.g. programs formed in the application software of the controller of the device. A task defined for a link agent is, for example, detecting the status of the peripheral device 6–15 and transmitting the status data e.g. to the server device 1, delivering e-mail to the user's data processor 14, 15, printing with a printer 6 connected to the local area network, etc. The link agents can also transmit information to be used by another link agent, if necessary.

Predetermined link agents can also be used as routers, which may be needed e.g. for delivering e-mail addressed to the user. For example, an e-mail transmission for the user is received by the e-mail server in the user's office, and this server is connected to a local area network 5 according to the invention, located in the office. One or several predetermined link agents available for transmitting e-mail messages are generated in this server. The link agent is equipped with data on the receiver, wherein the link agent can be used to find out, whether the user's data processor 14, 15 or the like is connected to the local area network at the time. In the positive case, one or several link agents containing this e-mail message are advantageously sent to this data processor 14, 15, in which the e-mail message is transferred from the link agent to the memory means of the data processor and the user is informed of the reception of the e-mail message, e.g. as a blinking icon on the display of the data processor.

If the user's data processor 14, 15 is not connected to this local area network 5, the link agent is used to find out e.g. in the user profile, if the user has another local area network in which he/she might have a data processor suitable for receiving e-mail messages, for example as a telecommunication terminal with a data processor, such as a personal digital assistant (PDA) or Nokia 9000 Communicator. It is thus possible to initiate setting up a data call to this telecommunication terminal for transmitting the e-mail message.

These link agents can transmit advantageously at least three different kinds of signalling information: transmission of registration data, setting up and breaking up a local area network, and synchronization of the status of the local area network 5. Further, it is possible to use these link agents for transmitting information, e.g. transmitting incoming information to a peripheral device 6–15 or to the server device 1, connected to the local area network 5. Moreover, link agents are suitable for retrieving information, if necessary; for example, the server device of the local area network 5 examines the status of a peripheral device 6–15 connected to the local area network 5. Similar intelligent agents are known in connection with the Internet network.

Predetermined link agents are also capable of learning, wherein the link agents are used for controlling the operation of the local area network 5 advantageously at least partly on the basis of user routines. As an example, printing of a document can be mentioned. If the user profile indicates that the user has previously printed documents with a laser printer, if one has been available, a laser printer is suggested as the printing device for the user, if a laser printer is connected to the local area network at the time. The user may change the printer to another or accept the suggested printing device. Accepting the suggested device can be made also in a way that if the user does not react to the suggested choice within a predetermined time, the user is considered to have accepted this choice.

It is obvious that the examples given above on predetermined link agents and their use are only examples for clarification, but there can also be other link agents possibly for other purposes.

Only authorized peripheral devices 6–15 can be connected to the local area network 5. For transmitting registration data, the server device 1 checks up the authorization of the peripheral device 6–15 being connected at the time and connects the peripheral device 6–15 to the local area network 5 if the peripheral device 6–15 in question is authorized to be connected to said local area network 5. Advantageously in connection with registration, also the so-called service class of the peripheral device 6–15 is determined, i.e. if it is a shared peripheral device, wherein it can simultaneously belong to several local area networks 5, or an unshared peripheral device. wherein it can belong to only one local area network 5 at a time. Further, it is possible to determine a possible encryption method and algorithm for data transmission. The server device 1 maintains information on peripheral devices 6–15 connected to the local area network and their statuses at the time.

Before setting up and possibly also during a connection, it is possible to examine the quality of service of the connection. Factors on this quality of service of the connection include the data transmission rate (e.g. bit rate) used in the communication, priority, i.e. importance classification, and reliability. The data transmission rate indicates how quickly information can be transmitted. By the priority classification, it is possible to determine in which order different connections are served. Reliability is affected i.e. by the signal level, environmental conditions, and possible devices causing interference, such as electric motors. Reliability can be usually evaluated e.g. by the number of error bits and retransmissions. The quality of the communication has an effect on e.g. whether a connection is set up and whether the connection is cut off when the quality becomes poorer. Too poor quality of connection might endanger the reliability of information to be communicated or it might cause an unnecessarily large number of retransmission trials.

The server device 1 monitors the local area network 5 by means of predetermined link agents and maintains information on the operating state and properties, e.g. storage capacity and activity data, of the peripheral devices 6–15 connected to the local area network at the time, as well as updates possible changes in each configuration of the local area network. These status and configuration data are stored e.g. in the memory means of the server device 1 or in a mass memory 9 connected to the local area network 5. The location where these data are stored as well as the storage format are dependent on the application in question, and this is prior art known to a man skilled in the art, wherein their more detailed description will not be necessary in this context.

The server device 1 of each local area network takes care of concealment of the data to be transferred in the local area network 5 in question; i.e. information from one local area network cannot be transferred to another local area network. For example identification data on the server device 1 can be utilized here. Thus, link agents to be transferred in the same local area network contain a code formulated on the basis of this identification data. This code will be examined by the peripheral device 6–15, and if the peripheral device is not connected to a local area network 5 corresponding to this code, the peripheral device 6–15 will not process this link agent.

Predetermined link agents can also be provided with information on the message type, e.g. telecopy, e-mail, voice message, data message, etc. It is advantageous to define for each peripheral device 6–15 what types of messages they can process.

Next, the operation of the example system of FIG. 1 will be described in a configuration situation. It is assumed that the local area network 5 is implemented as radio-frequency data transmission and that at least one of the peripheral devices 6–15 is turned on, wherein the peripheral device 6–15 is in ready state and advantageously examines intermittently communication on the channel frequency of the transmission band to find out if there are server devices 1 nearby. This can be implemented for example in a way that the receiver 16*b* of the short-distance link module of the peripheral device is turned on for a moment and the controller 16*d* of the short-distance link module of the peripheral device examines the voltage level of the AFC line 47 of the receiver (FIG. 4*b*). On the basis of the voltage level, the application software of the controller 16*d* can conclude, whether there is communication on said channel frequency. If there is no communication, the receiver 16*b* is turned off advantageously until the next moment of examining. If other communication is detected on the channel frequency, the received, demodulated signal is directed to the data input line of the controller 16*d* of the short-distance module of the peripheral device, wherein the received information is examined in the application software of the controller 16*d*. If the link agent is one intended for this peripheral device 6–15 or e.g. a general inquiry link agent for the configuration of the local area network 5 or a setting link agent for the state of the peripheral devices 6–15 that can be addressed to all peripheral devices for the local area network 5, the controller 16*d* will start performing the operations according to the link agent. These operations depend inter a/ia on the type and purpose of the link agent. Thus, intermittent turning on and off of the receiver can be used e.g. for reducing the power consumption of the peripheral device 6–15 (low power mode).

Predetermined link agents can also be used for turning the peripheral device 6–15 to power down mode, wherein a large part of the functions of the peripheral device are turned off. Thus, advantageously only the controller 16*d* of the short-distance link module is in operation, and the receiver 16*b* is turned on only intermittently. From the power down mode, the peripheral device 6–15 is returned to normal operation mode advantageously only in a case when the receiver 16*b* of the short-distance link module of the peripheral device has received a link agent addressed to this peripheral device 6–15.

It is obvious that the receiver 16*b* of the short-distance link module of the peripheral device can be turned on also all the time when the peripheral device 6–15 is turned on. Furthermore, the operation modes of short-distance link modules can be different in different peripheral devices. The operation of the short-distance link module 16 of the peripheral device and the short-distance link module 4 of the server device will be described below in this description.

When the user enters an office or the like where there are peripheral devices 6–15 of the invention, the server device 1 brought along by the user sends inquiry link agents through the short-distance link module 4. When a peripheral device 6–15 detects an inquiry link agent, the peripheral device will examine the content of the link agent. Having detected that it is an inquiry link agent of configuration data for setting up a local area network 5, the peripheral device 6–15 that received the link agent will generate a reply link agent of configuration data containing information on the type and properties as well as the current operation state of this peripheral device 6–15. Before sending the reply link agent to the server device 1, the peripheral device 6–15 examines preferably whether there is other communication on the channel frequency of the receiving band, possibly transmission of a reply link agent generated by another peripheral device 6–15. If there is no other communication, the peripheral device 6–15 sends a link agent which is received by the server device 1. The server device 1 examines the link agent received by it and transfers the configuration data contained in the link agent to the memory means 19 of the server device 1, advantageously to a random access memory (RAM). The memory means 19 of the server device comprise advantageously also a read only memory (ROM) and/or a non-volatile random access memory (NVRAM; FLASH) particularly for the storage of application software.

Further, the transmission of messages may involve different identification link agents or the like, whereby the server device 1 identifies the peripheral device and can secure that the peripheral device in question is authorized to be connected to this local area network. Moreover, the transmission of messages can be encrypted, wherein encryption of the information to be transmitted and decryption of the received information is conducted both in the short-distance link module 16 of the peripheral device and in the short-distance link module 4 of the server device. For encryption, it is possible to use one or several encryption methods or algorithms, known as such.

If the peripheral device 6–15 detects other communication on the channel frequency of the receiving band, the peripheral device may e.g. remain waiting for transmission until the communication on the channel frequency of the receiving band ceases, or the peripheral device re-examines within a predetermined interval if there is still communication on the channel frequency of the receiving band. In the latter alternative, different peripheral devices 6–15 can be set different time intervals for conducting re-examination, wherein a situation of two or more peripheral devices 6–15 trying to transmit simultaneously can be better avoided.

After the reply link agents of the peripheral devices 6–15 have been received and examined by the server device 1, it knows the configuration of the local area network in question as well as the status of the different peripheral devices 6–15 connected thereto. Thus, the server device 1 directs the link agents to the peripheral devices 6–15, for example a printing transmitted from a personal computer 14 to a printer 6, or a telecopy received by the long-distance link module 3 of the server device 1 to a telecopier device 7.

Setting Up a Link Connection

In the following, the setting up of a link connection LINK in a wireless local area network 5 according to an advantageous embodiment of the invention will be described by using as examples the advantageous embodiments of the server device 4 and the short-distance link modules 16 of the peripheral device shown in FIGS. 4a and 4b. Link connection refers in this description a data transmission connection to be formed between different devices e.g. for the transmission of link agents. In this example, the setting up of a link connection LINK between the server device 1 and one peripheral device 6–15 will be described, but the principles of this example can also be applied in link connections between the server device 1 and several peripheral devices 6–15 as well as in link connections between two or more peripheral devices 6–15, which may be necessary in some applications.

The receiver 4b of the short-distance link module 4 of the server device is directed to scan through the receiving band selected for the link connection LINK for finding a free channel e.g. by connecting a triangular wave form voltage to a frequency tuning line 31 and turning on a switch S1. The triangular wave is formed e.g. by means of the digital/analog converter (D/A) of the controller 4d of the short-distance link module. The triangular wave is led through the switch S1 and a resistance R1 to a capacitance diode D1. The change in voltage between the wires of the capacitance diode D1 causes a change in the capacitance of the capacitance diode D1. The capacitance diode D1 is connected to the frequency tuning circuit of the local oscillator 4c of the short-distance link module, wherein the frequency of the local oscillator 4c of the short-distance link module changes in proportion to the change in the voltage of the frequency tuning line 31. The frequency formed by the local oscillator 4c of the short-distance link module is directed to the mixer 25 of the receiver of the short-distance link module. Also connected to the mixer 25 is the antenna circuit of the link which comprises the receiving antenna 26 of the short-distance link module, a first band pass filter 27 and a high-frequency amplifier 28 of the receiver of the short-distance link module. As the pass band of the first band pass filter 27 is set the frequency range of the receiving band selected for the first link connection, wherein radio-frequency signals within this frequency range are directed to the mixer. From the output of the mixer 25, the mixing result is the difference between the local oscillator frequency and the received radio-frequency signal, which is led through a second band pass filter 29 to a detector 30. The width of the pass band of the second band pass filter 29 is substantially equal to the width of the channel, wherein signals possibly on the adjacent channels do not interfere with the demodulation. The demodulated signal is obtained from the output 32 of the detector. The demodulated signal is directed also to a low pass filter 34; and the low-pass filtered signal is led to an AFC line 33 whose voltage level is monitored by the controller 4d of the short-distance link module during scanning. In the apparatus of FIG. 4a, this takes place in the analog/digital converter (D/A) of the controller 4d which changes the voltage value to a digital value to be processed in the application software of the controller 4d. The voltage level of the AFC line is proportional to the DC level of the output of the detector 30. Upon receiving a signal transmitted by a peripheral device 6–15, it is possible to use the AFC line 33 for keeping the local oscillator frequency of the receiver locked to the carrier frequency of the transmitted signal.

On the basis of the voltage level of the AFC line 33, the controller 4d concludes whether there is other communication on the receiving band to be examined. If there is no other communication, it is possible to tune the receiver to any channel frequency of the receiving band. If there is other communication, a free channel must be selected from the receiving band. If there is no vacant channels, it is not possible to set up a connection to the peripheral device 6–15 on the selected receiving band. If a vacant channel is found, the receiver is tuned to said channel frequency, i.e. the control voltage corresponding to the selected channel frequency is set to the capacitance diode D1. Thus, the capacitance of the capacitance diode D1 set the frequency of the local oscillator 4c of the short-distance link module to correspond to the selected channel frequency. At the same time when the receiver 4b of the short-distance link module is tuned to the correct channel frequency, also the transmitter 4a of the short-distance link module is tuned at the duplex separation, because in this embodiment the local oscillator 4c of the short-distance link module is common to both the receiver 4b and the transmitter 4a of the short-distance link module.

The demodulated signal is obtained at the output 32 of the detector of the short-distance link module. When receiving a data signal, the controller 4d turns on a switch S4, wherein the data signal to be received is led to the controller 4d of the short-distance link module for examining and processing the received data (link agent). When receiving a transmission from the peripheral device 6–15, the AFC line 33 can be connected to the capacitance diode D1 by turning on the switch S3, wherein the receiver 4b is locked onto the frequency of the transmission.

After a free receiving channel is found, setting up a data transmission connection between the server device 1 and the peripheral device 6–15 can be started. The controller 4d of the short-distance link module turns on the transmitter 4a of the short-distance link module and turns on the switch S2.

FIG. 4a shows an advantageous embodiment of a mobile station MS which can be applied e.g. as the server device 1.

The transmitter 4a of the short-distance link module 4 arranged in connection with the mobile station MS operates in the following way. A modulating signal is led to the capacitance diode D2 whose capacitance changes according to the modulating signal. The data signal is led via the switch S2 and a separating means R3. The separating means R3 is primarily used as an impedance adapting means. The basic frequency of the oscillator 35 to be modulated is in this advantageous embodiment selected so that a frequency difference of the desired duplex separation is formed between the radio-frequency signal to be transmitted and the radio-frequency signal to be received. By using a common local oscillator 4c, it is possible to tune both the receiver and the transmitter so that the duplex separation remains constant irrespective of the channel in use. As a result of the modulation, a frequency-modulated signal is formed, which is led to the first input of the mixer 36 of the transmitter of the short-distance link module. To the second input of the mixer 36 is led the frequency of the local oscillator 4c of the short-distance link module which is set so that the receiver is tuned to the desired receiving frequency. Thus, the output of the mixer provides a modulated signal with the frequency of the transmitting channel, this signal being further amplified by the high-frequency amplifier 37 of the transmitter of the short-distance link module and low pass filtered in a low pass filter 38 e.g. for attenuating spurious emissions. From the low pass filter, the modulated radio-frequency signal is led to the transmitting antenna 39 of the short-distance link module.

In an advantageous embodiment of the short-distance link module 16 of the peripheral device shown in FIG. 4b, the transceiver operates substantially in the same way as the transceiver of the link module. The receiver 16b of the short-distance link module of the peripheral device is set to scan through the first transmission band selected for the first link connection e.g. by connecting a triangular form voltage to the frequency control line 40 and by turning on a switch S5. The triangular wave is led through the switch S5 and the resistance R2 to a capacitance diode D3. The capacitance diode D3 is used for controlling the frequency of the local oscillator 16 of the short-distance link module of the peripheral device in proportion to the change in the voltage of the frequency control line 40. The frequency formed by the local oscillator 16c of the short-distance link module of the peripheral device is led to the mixer 41 of the receiver of the short-distance link module of the peripheral device. From the receiving antenna 42 of the short-distance link module of the peripheral device, received radio-frequency signals are conveyed via a third band pass filter 43 for amplification to the high-frequency amplifier 44 of the receiver of the short-distance link module of the peripheral device and to the mixer 41 of the receiver of the short-distance link module of the peripheral device. From the output of the mixer 41, the differential signal between the local oscillator frequency and the received radio-frequency signal is led through a fourth band pass filter 45 to the detector 40 of the short-distance link module of the peripheral device. The width of the pass band of also the fourth band pass filter 45 is substantially equal to the width of the channel. The output signal of the detector 40 is led to the low pass filter 46 of the detector of the short-distance link module of the peripheral device, for forming an AFC signal. The demodulated signal is obtained from the audio line of the short-distance link module of the peripheral device. When receiving a data signal (link agent), the signal is led to the controller 16d of the short-distance link module of the peripheral device by turning on a switch S7. The controller 16d examines the received link agent and, if necessary, performs the operations defined in the link agent, if the link agent is intended for the peripheral device 6–15 in question. Further, the demodulated signal is led through the low pass filter 46 to the AFC line 47, whose voltage level is monitored by the controller 16d of the short-distance link module of the peripheral device. Locking to the frequency of the transmission is conducted advantageously by connecting the voltage of the AFC line 47 to the capacitance diode D3 of the local oscillator of the short-distance link module of the peripheral device, by turning on a switch S8.

In the transmitter 16a of the short-distance link module of the peripheral device, the data signal to be modulated is led to the capacitance diode D4 which is in the oscillator circuit of the modulator 48 whose basic frequency is selected so that a frequency difference of the desired duplex separation is formed between the radio-frequency signal to be transmitted and the radio-frequency signal to be received. The controller 16d turns on the switch S6 for the time of the data transmission. A separating means R4, coupled in series with the switch S6, is used as an adapting means. As the modulation result, a frequency modulated signal is formed, led to the first input of the mixer 49 of the transmitter. The frequency of the local oscillator 16c of the short-distance link module of the peripheral device is led to the second input of the mixer 49. Thus, from the output of the mixer, a frequency-modulated signal with the frequency of the transmission channel of the short-distance link module of the peripheral device is obtained and further amplified by the high-frequency amplifier 50 of the transmitter of the short-distance link module of the peripheral device and low pass filtered in a low pass filter 51, inter alia for attenuating spurious emissions. From the low pass filter, the modulated radio-frequency signal is led to the transmitting antenna 52 of the short-distance link module of the peripheral device.

In practical applications of the receivers 4b, 16b of the short-distance link module of the server device and the short-distance link module of the peripheral device, it is possible to use e.g. intermediate frequency circuits 21, 22 (IF) used in analog wireless communication devices and comprising e.g. a mixer, high-frequency and low-frequency amplifiers, a limiter, and a detector. The sensitivity of the circuits will be sufficient for this purpose. The circuits are inexpensive and their current consumption is low. Also for the implementation of the transmitter 4a, 16a, there are ready FM modulators 23, 24 available.

As controllers 4d, 16d, it is possible to use e.g. microcontrollers, known as such, provided with not only the processor but also with a random access memory (RAM), input and output (I/O) connection lines, an analog/digital (A/D) converter, a digital/analog (D/A) converter, as well as a read only memory (ROM). Particularly in applications where the link module 11 is integrated in the server device 1 or the peripheral device 6–15, the operations of the controller of the link module can be implemented at least partly also in the application software of the controller 4d, 16d of the device.

The switches S1, . . . , S8 are advantageously semiconductor switches, wherein the switches are controlled by connecting to the control line of the switch a voltage, on whose first value said switch is in the open state and on whose second value it is in the closed state. The first voltage value is e.g. about 0 V and the second value is a value close to the operating voltage $V_{CC}$. Thus, the control line can be connected to the binary I/O line (input/output) of the controller 4d, 16d, to which said two voltage values can be set by the application software of the controller.

Operating Example

FIG. 3 is a reduced arrow diagram showing a situation in which a telecopy is coming in to the server device 1. The arrows shown with a continuous line indicate the transfer of teleinformation, and, correspondingly, the arrows shown with a broken line indicate the transfer of signalling data. The telecommunication terminal 17 sending the telecopy has started call set-up (arrow 301). The call is transmitted e.g. via a landline telecommunication network 18 and a mobile communication network 3 (arrow 302) to the receiving telecommunication terminal, which in this case is consequently the server device 1 (arrow 303). Call set-up and reception is known as such, wherein it will not be necessary to describe them more closely in this context. Having detected an incoming telecopy transmission, the server device 1 examines the configuration data of the local area network and possibly the user profile to find out advantageously if a telecopier device 7 is connected to the local area network 5 at the time and how the user has usually received telecopies transmitted to him/her (arrows 304 and 305). If a telecopier device 7 is connected and, according to the user profile, the telecopy can be printed by the telecopier device 7, the server device 1 starts to set up a connection to said telecopier device 7 (arrow 306) and advantageously finds out the operating status of the telecopier device at the time (arrow 307). After setting up the connection, the telecopy is transmitted from the transmitting telecommunication terminal 17 (arrow 308) via the landline telecommunication network 18 and the mobile communication network 3 (arrow 309) to the server device 1 (arrow 310). For transferring the telecopy from the server device 1 to the telecopier device 7, the server device 1 generates from the incoming telecopy transmission predetermined link agents intended for transmitting information which are addressed to the telecopier device (arrow 311). The telecopier device 7 receives these link agents and, on the basis of information in the link agents, prints the telecopy e.g. on paper. During printing, the telecopier device 7 can, if necessary, send status link agents to the server device 1, e.g. for notifying that the telecopier device 7 cannot receive new link agents until the previous ones have been processed. After receiving the telecopy, the server device 1 will disconnect the call in a manner known as such.

Further, the user may be informed about the received telecopy e.g. by means of a message formed on the display of the server device 1, or by another suitable method. Informing is necessary particularly when there are several possible users of the telecopier device 7 and other users should be prevented from seeing the received telecopy.

In a situation when there is an incoming call from a long-distance network to a mobile station connected to a local area network, the local area network 5 of the invention will function primarily in the above-described way for transmitting a telecopy. The server device 1 will start to set up a connection within the local area network and cut the connection at the end of the call. When setting up a call from a peripheral device 6–15, such as a wireless audio user interface 8, connected to a local area network, the peripheral device will send a request for call setup to the server device 1 of the local area network which will start to set up a call.

The user can also forward e.g. e-mail messages addressed to the user for example to a portable computer 15 connected to a personal local area network 5, in which computer they are stored and from which the user can read the content of the messages. This takes place advantageously so that the server device 1 receives the incoming e-mail message and generates a predetermined link agent in which the message type is an e-mail message. This link agent is transmitted by the short-distance link module 4 to the local area network 5, wherein the portable computer 15 connected to the local area network 5 receives the link agent, unpacks the message transmitted in it, and stores it in the memory means of the portable computer 15, e.g. on a hard disk (not shown).

In a situation that a peripheral device 6–15 that is not yet connected to the local area network 5 is turned on, it is possible to carry out the configuration for example in the following way. The peripheral device 6–15 turned on sends the configuration data advantageously on the receiving channel monitored by the receiver 4b of the short-distance link module of the server device when the transmitter 4a of the short-distance link module of the server device is not transmitting. The received link agent is examined in the server device 1 and the configuration data are transferred into the configuration memory area, as presented above. On the other hand, instead of automatic configuration presented above, it is possible to generate a message to the user on the basis of the configuration data, wherein the user can choose whether or not the peripheral device 6–15 is to be connected to the local area network 5.

Because the status of the peripheral devices 6–15 can be changed also otherwise during their use, e.g. a printer 6a can print out slower than data is transmitted to it, it must be possible to transmit the status of the peripheral devices 6–15 to the server device 1 also during use of the peripheral device 5. Also in this connection it is possible to use predetermined link agents as described above, which are transmitted from the peripheral device 6–15 to the server device 1 e.g. on the channel frequency of the receiving band, wherein the server device 1, after receiving a link agent transmitted by a peripheral device 6–15, changes the status data of this peripheral device 6–15 in its configuration data respectively.

In the system presented above, the frequency range was divided into several channels, a free channel being selected for each connection. The system can also be implemented by one channel, wherein at least the receivers 4b, 16b of the short-distance link modules are simpler, because no scanning of the frequency range will be necessary. The system can be implemented by several channels also by reserving for each peripheral device 6–15 to be connected to the local area network 5 a separate frequency band from the frequency range allocated for the system. Thus, it will be possible, however, that two or more peripheral devices will try to send simultaneously. Nevertheless, the short-distance link module of the server device 1 comprises advantageously only one short-distance link receiver 4b, so that a link agent transmitted by only one peripheral device 6–15 can be received at a time. The reception of the link agent can be acknowledged e.g. so that the device which received the link agent transmits a predetermined link agent to be selected on the basis whether or not the link agent was received correctly. The check-up can be made e.g. by using check sums or the like, known as such. On the basis of the acknowledgement link agent, the device which transmitted the link agent can conclude if the link agent was received correctly. If there is no acknowledgement or the acknowledgement link agent shows that the link agent was not received correctly, a retransmission can be made for example as long as the transmission is successful or the number of retransmissions is exceeded. In a situation where transmission is not successful, the server device 1 advantageously sets the status data of the peripheral device 6–15 inactive, i.e. the peripheral device 6–15 is disconnected from the network. The status of the peripheral device 6–15 can, however, be checked later to make reconnection of the peripheral device 6–15 possible.

EXAMPLE 2

The local area network 5 of the invention can be implemented in several, functionally separate personal local area networks. For example, one advantageous alternative embodiment operates in the following way. The server device 1 of each user carries out its own configuration procedure advantageously according to the operating principles presented above. Thus, it is possible to allocate different local area networks their own frequency ranges or, in solutions based on time-division techniques, it is possible to use the same frequency range so that a different time interval is allocated for communication in each local area network. In such solutions comprising several networks, one must secure that information is delivered to the correct address inter alia to prevent that information to be transmitted in a different local area network is not accessible to equipment of another local area network. For implementing this, each local area network to be formed can be allocated their own identification code based e.g. on the identification code of the server device 1, such as the international mobile equipment identification IMEI. Thus, in peripheral devices, a separate memory range in the memory means is reserved for exchange of data in each local area network, and this identification data is stored in this memory range advantageously at the stage of configuration of the local area network 5. Accomplishing such several simultaneous, preferably separate local area network 5, gives the advantage that the peripheral devices 6–15 of an office can be available to several users, even though the peripheral device 6–15 were already operationally connected to some local area network 5. Different users can simultaneously make use of different peripheral devices 6–15, and a peripheral device 6–15 that was used by one user will be available to another user immediately at the moment when the peripheral device 6–15 becomes vacant. Such peripheral devices include printers 6 and telecopier devices 7 whose utilization rate with one user becomes usually relatively low. If connection of a peripheral device 6–15 to one local area network 5 prevented the use of the peripheral device 6–15 in other local area networks, the use of the peripheral devices 6–15 would become difficult and their utilization rate would be lower than what is possible to achieve with the solution presented above.

EXAMPLE 3

Although in the above-described example the user carries along a server device 1 and the local area network 5 is formed when the user comes e.g. into an office, home or another room provided with peripheral devices of the invention, it is possible to apply the invention also in a way that the server device 1 is stationary. Thus, the user carries along a peripheral device which activates formation of a local area network 5 for the user. This is conducted e.g. in a way that the peripheral device carried along by the user transmits a predetermined link agent which is received by the server device 1. On the basis of the content of the link agent received, the server device 1 starts to set up a local area network in a way presented earlier in this description.

Moreover, the local area network 5 of the invention can be implemented so that it is not bound to the operation by the user. The local area network 5 can be formed always when the server device 1 is turned on. Thus, peripheral devices are connected to the local area network advantageously when they are turned on. Transmission of information in the local area network takes place at least partly by using predetermined link agents as described above. In this embodiment, the local area network 5 is also not necessarily limited to the use by one user, but several users can be registered into the same local area network 5 and use peripheral devices connected to it without the need for each user to activate a local area network 5 of his/her own.

Disconnection of a Local Area Network

A local area network 5 can be disconnected e.g. when activated by a user. The server device 1 sends a predetermined link agent whose information content will direct the peripheral devices connected to the local area network 5 to set their status data in a state where they are no longer connected to this local area network 5.

In the advantageous embodiments of the invention above, the local area network 5 was formed as a client-server type star network, i.e. link agents were transferred between a server device 1 and peripheral devices (client), controlled by the server device 1. The invention can also be applied in another structure, such as a ring network, wherein link agents can be transferred also directly between peripheral devices. Thus, each link agent is transmitted from the transmitting device to the next device in the ring which will transmit it further until the link agent achieves the device defined as the addressee in said link agent.

The present invention is not limited solely to the examples given above but it can be modified within the scope of the appended claims.

What is claimed is:

1. A wireless local area network comprising a number of devices, including a server device and one or more peripheral devices, communication between devices in the wireless local area network being arranged to be conducted at least partly by means of link agents, said link agents being associated with tasks to be performed in the wireless local area network and devices in the wireless local area network comprising means for generating link agents, means for transmitting link agents, means for receiving link agents, and means for processing link agents in order to perform tasks associated with said link agents, said link agents being independent of the devices in the wireless local area network, such that performance of a particular task associated with a particular link agent is not bound to a particular device in the wireless local area network and can be transferred to another device in the wireless local area network.

2. A wireless local area network according to claim 1, wherein performance of a particular task associated with a particular link agent can be transferred to a device external to the wireless local area network.

3. A wireless local area network according to claim 1, wherein performance of a particular task associated with a particular link agent can be transferred to a device in another wireless local area network.

4. A wireless local area network according to claim 1, wherein said server device comprises means for generating a link agent associated with a particular task to be performed in the wireless local area network, means for transmitting said link agent from the server device to one of said one or more peripheral devices, said peripheral device comprising means for receiving the link agent, means for processing the link agent, and means for performing the particular task associated with said link agent.

5. A wireless local area network according to claim 4, wherein said one of said one or more peripheral devices further comprises means for transmitting said link agent from said peripheral device to another one of said one or more peripheral devices, said other peripheral device comprising means for receiving the link agent, means for processing the link agent, and means for performing the particular task associated with said link agent.

6. A wireless local area network according to claim 1, wherein said server device comprises means for generating a link agent associated with a particular task to be performed in the wireless local area network, means for transmitting said link agent from the server device to all of said one or more peripheral devices, each of said peripheral devices comprising means for receiving the link agent, means for processing the link agent, and means for performing the particular task associated with said link agent.

7. A wireless local area network according to claim 6, wherein said link agent is one of the following: a general inquiry link agent for configuration of the local area network, and a setting link agent for setting the peripheral devices into a certain state.

8. A wireless local area network according to claim 1, wherein said tasks to be performed in the wireless local area network include: transmitting signalling information, transmitting registration data, setting up the wireless local area network, breaking up the wireless local area network, synchronising the status of the wireless local area network, transmitting information to a peripheral device, monitoring the status of the wireless local area network, delivering an e-mail message, delivering a telecopy to a telecopier device connected to the wireless local area network, operating a printer connected to the wireless local area network, retrieving information, examining the status of a peripheral device, setting a peripheral device into a particular state, and routing information within the local area network.

9. A wireless local area network according to claim 1, wherein said link agents are arranged to adapt the performance of tasks in the wireless local area network in dependence on the configuration of the wireless local area network.

10. A wireless local area network according to claim 1, wherein said link agents are arranged to adapt the performance of tasks in the wireless local area network in response to the previous behavior of a user of the wireless local area network.

11. A wireless local area network according to claim 1, wherein the server device is arranged to set up the wireless local area network.

12. A wireless local area network according to claim 11, wherein the server device is arranged to set up the wireless local area network by transmitting link agents to peripheral devices that are to be connected in the wireless local area network.

13. A wireless local area network according to claim 11, wherein the server device is arranged to set up the wireless local area network by transmitting a link agent for obtaining the configuration data of a peripheral device to each peripheral device that is to be connected in the wireless local area network and each peripheral device to be connected in the local area network comprises means for generating a link agent indicating the configuration data of the peripheral device, and means for transmitting said link agent to the server device.

14. A wireless local area network according to claim 13, wherein the configuration data of a peripheral device comprises the following information: the type of the peripheral device; the properties of the peripheral device; and the operating status of the peripheral device.

15. A wireless local area network according to claim 1, wherein the server device is portable.

16. A wireless local area network according to claim 15, wherein the portable server device is a mobile station further comprising means for setting up a connection to a mobile communication network.

17. A wireless local area network according to claim 15, wherein the portable server device is arranged to set up the wireless local area network automatically when in a location where devices suitable for connection to the wireless local area network are available.

18. A wireless local area network according to claim 1, wherein the server device is stationary.

19. A wireless local area network according to claim 1, wherein the wireless local area network is allocated an identification code.

20. A wireless local area network according to claim 19, wherein the identification code allocated to the wireless local area network is based on an identification code of the server device.

21. A wireless local area network according to claim 20, wherein the server device is a mobile station further comprising means for setting up a connection to a mobile communication network and the identification code allocated to the wireless local area network is based on the International Mobile Equipment Identity (IMEI) of the mobile station.

22. A wireless local area network according to claim 19, wherein the identification code allocated to the wireless local area network is used in the wireless local area network to ensure that information transmitted between devices in the wireless local area network is not accessible to devices in another local area network.

23. A wireless local area network according to claim 1, wherein at least one of said peripheral devices may simultaneously be connected in said wireless local area network and in another wireless local area network.

24. A wireless local area network according to claim 1, wherein the server device is arranged to be substantially stationary in the wireless local area network, and at least one of said one or more peripheral devices is a portable peripheral device and is arranged to activate the wireless local area network.

25. A wireless local area network according to claim 24, wherein the portable peripheral device is arranged to activate the wireless local area network by transmitting a link agent to the server device and the server device is further arranged to set up the wireless local area network responsive to receipt of said link agent.

26. A wireless local area network according to claim 24, wherein the portable peripheral device is arranged to set up the wireless local area network automatically when in a location where devices suitable for connection to the wireless local area network are available.

27. A wireless local area network according to claim 1, wherein communication between devices in the wireless local area network is affected by means of a radio frequency connection.

28. A wireless local area network according to claim 1, wherein communication between devices in the wireless local area network is affected by means of an optical connection.

29. A system of wireless local area networks comprising at least a first wireless local area network and a second wireless local area network, each of said first and second wireless local area networks comprising a number of devices, including a server device and one or more peripheral devices, communication between devices in both of said first and said second wireless local area networks being arranged to be conducted at least partly by means of link agents specific respectively to said first wireless local area network and to said second wireless local area network, link agents specific to the first wireless local area network being associated with tasks to be performed in the first wireless local area network and link agents specific to the second wireless local area network being associated with tasks to be performed in the second wireless local area network, devices in the first and the second wireless local area networks comprising means for generating link agents, means for transmitting link agents, means for receiving link agents, and means for processing link agents in order to perform tasks associated with said link agents, said link agents specific to the first wireless local area network and said link agents specific to the second wireless local area network further being independent of the devices in respectively the first wireless local area network and the second wireless local area network, such that performance of a particular task associated with a particular link agent in the first wireless local area network is not bound to a particular device in the first wireless local area network and performance of a task associated with a particular link agent in the second wireless local area network is not bound to a particular device in the second wireless local area network and said tasks can be transferred to another device within respectively the first or the second wireless local area network.

30. A system of wireless local area networks according to claim 29, wherein performance of a task associated with a particular link agent in the first wireless local area network is arranged to be transferred to the second wireless local area network.

31. A system of wireless local area networks according to claim 29, wherein at least one of said devices in said first wireless local area network is common to said second wireless local area network.

32. A system of wireless local area networks according to claim 29, wherein said server device is common to said first wireless local area network and said second wireless local area network.

33. A system of wireless local area networks according to claim 29, wherein at least one of said one or more peripheral devices is common to said first wireless local area network and said second wireless local area network.

34. A method for communicating in a wireless local area network, the wireless local area network comprising a number of devices, including a server device and one or more peripheral devices, said method comprising communicating between devices in the wireless local area network at least partly using link agents, and associating said link agents with tasks to be performed in the wireless local area network comprising means for generating link agents, means for transmitting link agents, means for receiving link agents, and means for processing link agents in order to perform tasks associated with said link agents, said link agents being independent of the devices in the wireless local area network, such that performance of a particular task associated with a particular link agent is not bound to a particular device in the wireless local area network and can be transferred to another device in the wireless local area network.

35. A method according to claim 34, comprising:
generating in the server device a link agent associated with a particular task to be performed in the wireless local area network;
transmitting said link agent from the server device to one of said one or more peripheral devices;
receiving the link agent at said peripheral device; and
processing the link agent in the peripheral device to perform the particular task associated with the link agent.

36. A method according to claim 35, further comprising:
transmitting said link agent from said one of said one or more peripheral devices to another one of said one or more peripheral devices;
receiving the link agent at said other peripheral device; and
processing the link agent in said other of said one or more peripheral devices so as to perform the particular task associated with the link agent.

37. A method according to claim 34, comprising:
generating in the server device a link agent associated with a particular task to be performed in the wireless local area network;
transmitting said link agent from the server device to all of said one or more peripheral devices;
receiving the link agent at each of said one or more peripheral devices; and
processing the link agent in each of said one or more peripheral devices so as to perform the particular task associated with said link agent at each of said one or more peripheral devices.

38. A method according to claim 37, wherein said link agent is one of the following: a general inquiry link agent for configuration of the local area network, and a setting link agent for setting the peripheral devices into a certain state.

39. A method according to claim 34, wherein said tasks to be performed in the wireless local area network include: transmitting signalling information, transmitting registration data, setting up the wireless local area network, breaking up the wireless local area network, synchronising the status of the wireless local area network, transmitting information to a peripheral device, monitoring the status of the wireless local area network, delivering an e-mail message, delivering a telecopy to a telecopier device connected to the wireless local area network, operating a printer connected to the wireless local area network, retrieving information, examining the status of a peripheral device, setting a peripheral device into a particular state, and routing information within the local area network.

40. A method according to claim 34, wherein said link agents are arranged to adapt the performance of tasks in the wireless local area network in dependence on the configuration of the wireless local area network.

41. A method according to claim 34, wherein said link agents are arranged to adapt the performance of tasks in the wireless local area network in response to the previous behavior of a user of the wireless local area network.

42. A method according to claim 34, wherein the server device sets up the wireless local area network.

43. A method according to claim 42, wherein the server device sets up the wireless local area network by transmitting link agents to peripheral devices that are to be connected in the wireless local area network.

44. A method according to claim 42, comprising the following steps to set up the wireless local area network:
generating in the server device a link agent for obtaining the configuration data of a peripheral device;
transmitting the link agent for obtaining the configuration data of a peripheral device to each peripheral device that is to be connected in the wireless local area network;

generating in each peripheral device that is to be connected in the wireless local area network a link agent indicating the configuration data of the peripheral device; and transmitting the link agent from each peripheral device that is to be connected in the wireless local area network to the server device.

45. A wireless local area network according to claim 44, wherein the configuration data of a peripheral device comprises the following information: the type of the peripheral device; the properties of the peripheral device; the operating status of the peripheral device.

46. A method according to claim 34, wherein the server device is portable.

47. A method according to claim 46, wherein the portable server device is a mobile station comprising means for setting up a connection to a mobile communication network.

48. A method according to claim 46, wherein the portable server device sets up the wireless local area network automatically when in a location where devices suitable for connection to the wireless local area network are available.

49. A method according to claim 34, wherein the server device is stationary.

50. A method according to claim 34, wherein the wireless local area network is allocated an identification code.

51. A method according to claim 50, wherein the identification code allocated to the wireless local area network is based on an identification code of the server device.

52. A method according to claim 51, wherein the server device is a mobile station comprising means for setting up a connection to a mobile communication network and the identification code allocated to the wireless local area network is based on the International Mobile Equipment Identity (IMEI) of the mobile station.

53. A method according to claim 51, wherein the identification code allocated to the wireless local area network is used in the wireless local area network to ensure that information transmitted between devices in the wireless local area network is not accessible to devices in another local area network.

54. A method according to claim 34, wherein at least one of said peripheral devices may simultaneously be connected in said wireless local area network and in another wireless local area network.

55. A method according to claim 34, wherein the server device is substantially stationary in the wireless local area network, and at least one of said one or more peripheral devices is a portable peripheral device, said portable peripheral device being arranged to activate the wireless local area network.

56. A wireless local area network according to claim 55, wherein the portable peripheral device activates the wireless local area network automatically when in a location where devices suitable for connection to the wireless local area network are available.

57. A method according to claim 55, wherein the portable peripheral device activates the wireless local area network by transmitting a link agent to the server device and the server device sets up the wireless local area network responsive to receipt of said link agent.

58. A method according to claim 34, wherein communication between devices in the wireless local area network is affected by means of a radio frequency connection.

59. A method according to claim 34, wherein communication between devices in the wireless local area network is affected by means of an optical connection.

60. A mobile station comprising means for setting up a connection to a wireless local area network, communication between devices in the wireless local area network being arranged to be conducted at least partly by means of link agents, said link agents being associated with tasks to be performed in the wireless local area network, the mobile station comprising means for generating link agents, means for transmitting link agents, means for receiving link agents, and means for processing link agents in order to perform tasks associated with said link agents, said link agents being independent of the devices in the wireless local area network, such that performance of a particular task associated with a particular link agent is not bound to a particular device in the wireless local area network and can be transferred to another device in the wireless local area network.

61. A mobile station according to claim 60, further comprising means for activating the local area network.

62. A mobile station according to claim 60, arranged to operate as a server device in the wireless local area network.

63. A mobile station according to claim 60, arranged to operate as a peripheral device in the wireless local area network.

64. A mobile station according to claim 60, further comprising means for setting up a connection to a mobile communication network.

65. A peripheral device for use in a wireless local area network in which communication between devices is arranged to be conducted at least partly by means of link agents, said link agents being associated with tasks to be performed in the wireless local area network, the peripheral device comprising means for setting up a connection to the wireless local area network, means for generating link agents, means for transmitting link agents, means for receiving link agents, and means for processing link agents in order to perform tasks associated with said link agents, said link agents being independent of the devices in the wireless local area network, such that performance of a particular task associated with a particular link agent is not bound to a particular device in the wireless local area network and can be transferred to another device in the wireless local area network.

66. A link agent for conducting communication in a wireless local area network, the wireless local area network comprising a number of devices, including a server device and, one or more peripheral devices, communication between devices in the wireless local area network being arranged to be conducted at least partly by means of link agents, said link agents being associated with tasks to be performed in the wireless local area network and being independent of the devices in the wireless local area network, such that performance of a particular task associated with a particular link agent is not bound to a particular device in the wireless local area network and can be transferred to another device in the wireless local area network.

* * * * *